United States Patent [19]
Leenhouts et al.

[11] 3,963,971
[45] June 15, 1976

[54] VELOCITY CHANGE CIRCUIT FOR A DIGITAL MOTOR

[75] Inventors: Albert C. Leenhouts, Harwinton; Peter Senak, Jr.; Arthur Emery, both of Bristol, all of Conn.

[73] Assignee: The Superior Electric Company, Bristol, Conn.

[22] Filed: Dec. 19, 1974

[21] Appl. No.: 534,565

[52] U.S. Cl. .................... 318/696; 318/603
[51] Int. Cl.² .................. G05B 19/40; G05B 19/28
[58] Field of Search ........... 318/571, 685, 696, 600, 318/603

[56] References Cited
UNITED STATES PATENTS

| | | |
|---|---|---|
| 3,579,279 | 5/1971 | Inaba .................................. 318/696 |
| 3,605,000 | 9/1971 | Inaba .................................. 318/603 |
| 3,835,360 | 9/1974 | Kiwiet ................................. 318/571 |
| 3,904,858 | 9/1975 | Rosshirt .............................. 318/696 |
| 3,908,195 | 9/1975 | Leenhouts ........................... 318/696 |

Primary Examiner—Gene Z. Rubinson
Assistant Examiner—John J. Feldhaus
Attorney, Agent, or Firm—Ernest M. Junkins

[57] ABSTRACT

A digital circuit for translating each input command pulse into an incremental step of a digital motor in which the input pulses may be received at any rate while the pulses to the motor and hence the motor velocity are produced at rates which is within the motor's ability to change its velocity. The system uses a digitally operated circuit that can be easily adjusted to different motor velocity abilities and also enables control over both directions of motor movement.

14 Claims, 2 Drawing Figures

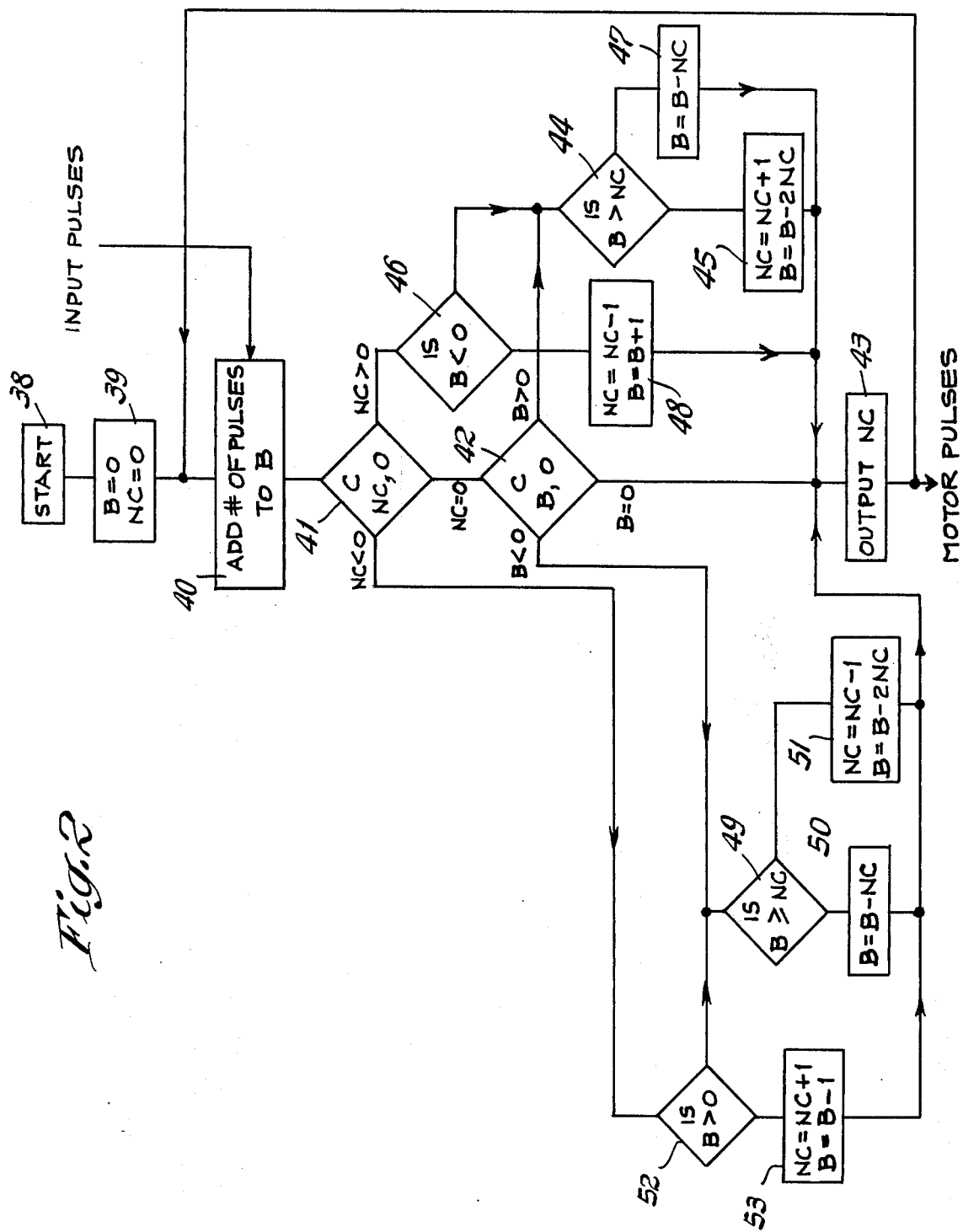

VELOCITY CHANGE CIRCUIT FOR A DIGITAL MOTOR

In U.S. Pat. No. 3,553,549, assigned to the assignee of the present invention, there is disclosed a circuit that accepts input command pulses and causes an incremental step or movement of a digital motor to be produced for each pulse. The ability of a motor and its load to change velocity is limited and the circuit limits the rate of change of velocity to that within its ability so that the loss of a step, i.e., a pulse is not translated into a step, is prevented. Thus, input pulses may be received at many different rates without the motor velocity being required to simultaneously follow each of the input pulse rates.

Though such a system has been found to be completely satisfactory, it contains a plurality of analog devices which set the different speeds of the motor in accordance with the number of pulses to be supplied. These devices not only have to be manually adjusted to an operating situation for one value of change of velocity ability but also may be required to be readjusted for each change in the motor's operating situation where the velocity ability also changes. Moreover, the system is only capable of controlling movement in one direction and to enable the system to handle input pulses commanding movement in both directions, a preliminary input pulse accepting circuit such as shown in U.S. patent application Ser. No. 342,878 now abandoned, assigned to the assignee of the present invention, is required.

It is accordingly an object of the present invention to provide a circuit for accepting input pulses and limiting the change in velocity of a digital motor and in which the circuit operates digitally, without analog devices.

Another object of the present invention is to achieve the above object with a circuit that is easily adjusted to a motor's ability and also one which may be easily readjusted for any change in the motor's ability if there is a change in the situation.

Still another object is to provide a circuit that though relatively simple in construction is capable of accepting input pulses directing movement in both directions and causing the motor to produce the net difference of the input pulses.

A further object of the present invention is to provide a circuit that while achieving the above objects is completely digital in operation, requires only a small number of registers and which is capable of being constructed from relatively inexpensive semi-conductor components.

The circuits disclosed in the above-noted patent and application and the present invention are most advantageously used with a motor means which is energized to produce a step essentially simultaneously with receipt of a motor pulse. Thus, the rate of the motor pulses sets the motor velocity while the number of pulses sets the amount of the movement. However, the invention may also be used with digital servo motors in which there is a known proportionate lag between motor steps and input pulses as may occur with a D.C. servo motor.

In carrying out the present invention, the system uses a concept disclosed in U.S. patent application Ser. No. 433,844, also assigned to the assignee of the present invention. This concept requires that the motor pulses be supplied in groups with all pulses in each group being at the same rate but with the rate differing between adjacent groups. The rate difference between groups is limited to no more than the motor's ability to have its velocity changed from that of the old group rate to that of the new group pulse rate in the time interval over which the pulses are supplied at the new group rate. A short time interval is preferably selected to enable rapid changes in velocity and as in one embodiment herein described is made to have a duration in which the group rate difference is made to produce a difference in the number of pulses between adjacent groups to no more than one pulse, though if desired, another maximum pulse number difference could be employed. Thus, with a maximum of a one pulse difference and a constant time interval, the number of pulses in each present group is limited to either having the same number of pulses that the immediately prior group had, having just one more pulse or having just one less pulse, with the group pulse rates being set accordingly.

The circuit determines for each group the number of pulses in the group by determining if there should be a difference from the number in the prior group and if so, whether it should increase the number of pulses or should decrease the number of pulses. The determination is rendered quite simply by requiring only two registers, one which maintains a count of the number of pulses in the group and the other the difference between the number of steps remaining to be taken at the end of a present group and the number of steps needed for deceleration at the beginning of the present group. The count of the second register is compared with the first and if the second is larger, it generally causes the number of pulses in the present group to increase over the prior group number to accelerate the motor while if smaller, it generally decreases the number of pulses in the present group to decelerate the motor. After the determination for each group, the counts of each register are changed for the number of pulses supplied to the motor means.

The circuit is rendered bi-directional by having both registers capable of containing positive and negative numbers. By assigning a motor direction to each sign of each register and using a zero comparison, the same determination may be made with the assurance that the motor, irrespective of its direction of movement, will not be requested to exceed its change of velocity ability.

Other features and advantages will hereinafter appear. In the drawing:

FIG. 2 is a flow chart illustrating the steps that are followed by the logic portion of the circuit for each group.

Figure 1:
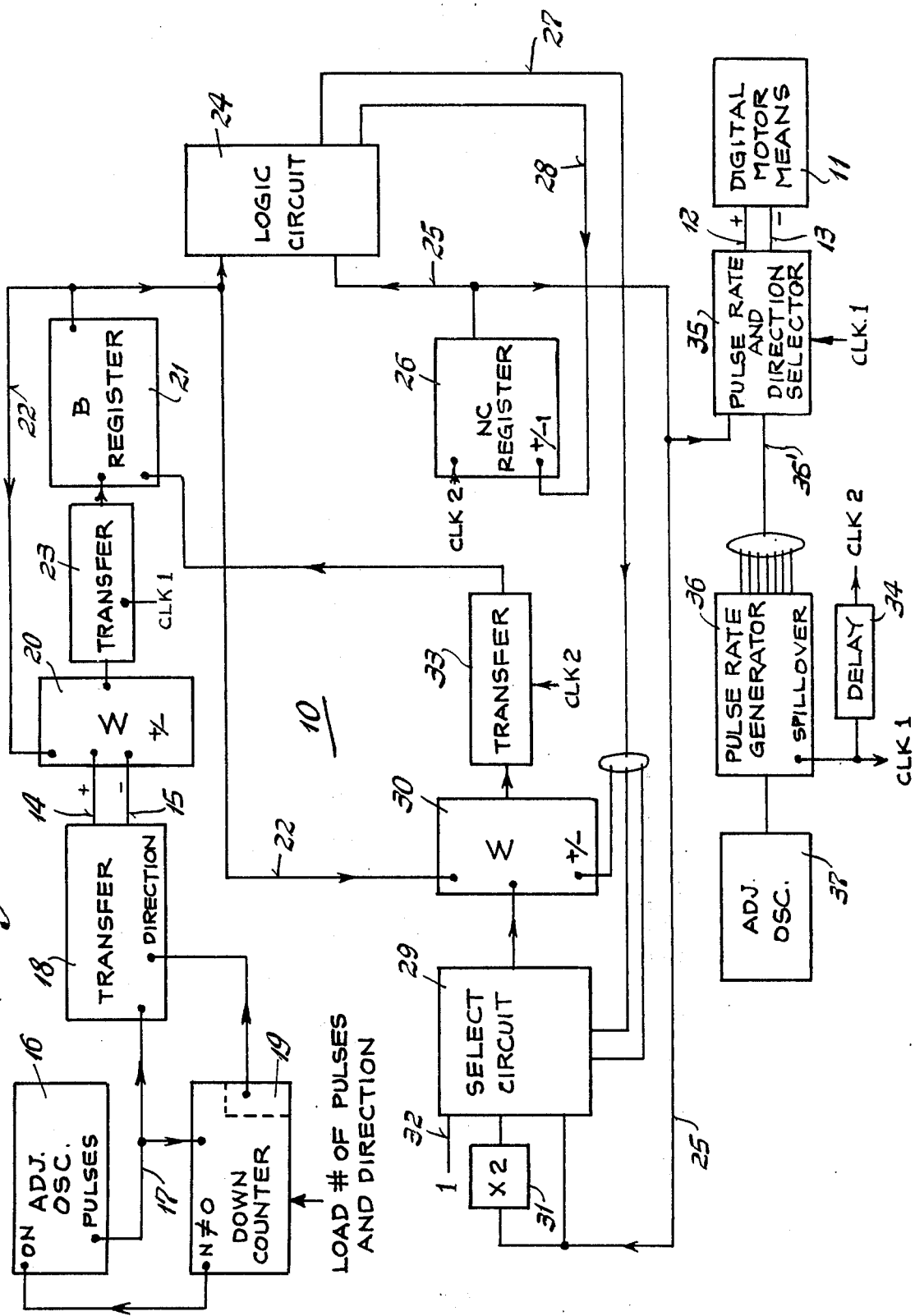
FIG. 1 is a block diagram of the circuit of the present invention.

Referring to the drawing, the circuit of the present invention is generally indicated by the reference numeral 10 and includes a digital motor means 11 that produces a step in one direction for each motor pulse that it receives on a + lead 12. It also produces a step but in the other direction for each motor pulse received on a − lead 13.

The total number of motor steps equals the number of input pulses that are received on a + lead 14 for the one direction movement or a − lead 15 for the other direction. While individual pulses may be conducted to these leads from any pulse producing circuit, the embodiment herein disclosed utilizes an adjustable oscillator 16 for providing pulses on a lead 17 through a transfer block 18 to the leads 14 and 15. A counter 19 set to the number of steps the motor is to produce may be used to cause the same number of input pulses to be provided by the oscillator. As will be hereinafter apparent, the rate at which the oscillator 16 produces pulses, basically sets the maximum speed of the motor during the intermediate portion of a movement and hence serves as a speed controlling device.

The input pulses either individually or as a number are supplied to an adder 20 which also receives the count of a B register 21 by way of a lead 22. The adder 20 algebraically adds the number of input pulses to the count of the B register and by way of a transfer block 23 causes the sum to be the count of the B register each time a clk 1 signal appears.

The B count lead 22 is also connected as an input to a logic block 24 which also receives the current count on a lead 25 of an NC register 26. The logic block compares the B register count and the NC register count with zero and with each other to produce signals on a plural lead 27 and on an NC register increment lead 28.

The plural lead 27 determines by way of a select circuit block 29 which of three values to transfer to an adder 30. One value is the count of the NC register that appears on the lead 25, another value is twice the NC value as calculated by a "X2" block 31 while the third value is a unit increment indicated by the reference numeral 32.

The adder 30 has a connection to one of the leads 27 which controls whether the value selected by the circuit block 29 is to be a + number or a − number. Additionally, the B count lead 22 is also connected as an input to the adder 30 to have the B register count available to the adder both as to value and direction. The adder thus algebraically adds one of the three values from the select circuit to the count of the B register.

The output of the adder 30 is connected through a transfer switch 33 to the B register 21 to cause the B register to assume the count of the adder 30 whenever a clk 2 signal occurs. A clk 2 signal is made to occur shortly after a clk 1 signal and hence could be derived as shown from the clk 1 pulse through the use of a delay block 34.

Thus the B register count (a numerical value and an algebraic sign indicating direction) is initially caused to be altered by the number of input pulses that appear with the clk 1 signal by way of the adder 20, and then caused to assume the count determined by the adder 30 with the appearance of the clk 2 signal.

The count of the NC register, which is a whole number, sets the number of motor pulses that are to be produced in a time interval an also on which direction lead 12 or 13 the pulses are to appear. The NC count lead 25 is connected to a "pulse rate and direction selector" 35 as is a plural rate lead 36' from a pulse rate generator 36. The input to the generator is from an adjustable oscillator 37. The generator 36 may take the form of a spillover counter with different counts appearing as pulses on its rate leads. Thus if it has a 64 count, one lead would produce a pulse for each 32 count; for two pulses in the same time interval, counts 15 and 45 are utilizable; for 3 pulses, 11, 32 and 53 counts may be used, etc. Thus, in the same time interval, the generator 36 produces a different whole number of essentially evenly spaced pulses with each having a different rate. The selecting circuit will select the lead having the rate which is the same as the value of NC to connect to the motor pulse leads 12 or 13 to thus have the number of pulses corresponding to the value of NC supplied to the motor during the time interval.

The clk 1 pulse is derived from the spillover terminal of the generator and in the embodiment described would thus appear with each 64th pulse from the oscillator 37.

The logic circuit 24 and other components of the circuit are constructed to follow the method disclosed by the flow chart shown in FIG. 2. A start block 38 energizes the circuit and by a block 39 the counts of the B and NC registers are set to zero. Block 40 by way of a clk 1 signal causes functioning of adder 20 and transfer 23 to set the count of the B register to its value. A decision block 41 compares the count of the NC register with zero and assuming it is zero, another decision block 42 is encountered which compares the B register count with zero. If it is also zero then a value of NC=0 is outputted by a block 43 and no motor or command pulses occur.

If, however, the B register has a count, indicating that movement has been commanded and if the direction is forward, so the count is +, then block 42 directs a comparison of the counts of the B and NC registers by a block 44. Assuming the B count to be greater than the NC count, a block 45 increases the count of NC by 1 (lead 28) and causes through select block 29, adder 30 and transfer switch 33, the count of the B register to be decreased (−) by a value of 2NC (NC now being 1). The NC count is then outputted to produce one motor pulse on the + lead 12.

The above determination increases the count of NC by 1 to increase the number of motor pulses in the present group by 1 over the number of motor pulses in the prior group. This accelerates the motor and occurs whenever the count of the B register is + and more than zero (block 46); is greater than NC and the NC count is + and greater than zero.

If with the NC and B counts both being + and greater than zero but the B count is not greater than the NC count, then a block 47 is encountered which maintains the same number of motor pulses in the present group as in the prior group (NC is not changed) and changes the count of the B register by − NC. The motor thus maintains the same speed as the prior group.

For the instance when the B register count is less than zero while the NC count is greater than zero, deceleration must occur so a block 48 decreases the count of NC by 1 to reduce the number of pulses in the present group by one and the value of 1 is added to the B register.

Thus the B register has its count increased by 1 for each decelerating group, decreased by the value of NC for maintaining the same velocity, i.e., same number of pulses in the group and decreased by two times the value of NC for each accelerating group. Moreover, its value is increased by any input pulses that may be received between during each time interval. In this manner, the B register maintains a count that is equal to the difference between the number of steps remaining to be taken after taking the present group steps and the number of steps needed for deceleration at the beginning of the present group.

While the above description relates to movement in only the forward direction, the circuit is capable of also controlling motor movement in the other direction. Thus, if input pulses based on a direction command appear on − input lead 15, motor pulses are caused to appear on the − motor lead 13. With a − count in the B register, and NC=0, block 42 directs the equence to a block 49, so that blocks 50 and 51 alter the value towards zero of the B register count in the same manner as blocks 47 and 49 respectively, functioned. Also the count of NC either is maintained the same or made more negative by the algebraic addition thereto of −1. for negative values of NC, block 41 directs the sequence to a block 52 which in turn if deceleration is needed (B is greater than 0) directs the flow to a block 53 which decreases the number of negative pulses by 1 in the group while incrementing the B register by +1.

As used herein, if a value is indicated as being subtracted (−) from the B register, it causes the count to decrease by this value towards zero.

The circuit permits the addition of input pulses either completely prior to motor movement (oscillator 16 operated at very high speed) or while motor movement is taking place (oscillator 16 at lower speed). In the latter instance, the rate of oscillator 16 sets the maximum speed of the motor as the circuit, after perhaps a slight overshoot, will cause the value of NC to be equal (or essentially approximate) the number of input pulses received for each time interval. Thus, during the intermediate portion of a movement, the oscillator 16 may be used to control the velocity of the motor.

It is also noted that the present system may accept input pulses directing movement in one direction, have the motor moving in such a direction and then accept input pulses for movement in the reverse direction. If the net difference causes the B register count to remain greater than zero so that movement in the first direction is to continue with only the number of steps remaining in the forward direction being decreased, then the system will determine each value for NC based on the B register count using blocks 47, 45 and 48. If block 48 is employed, as decleration is required, the rate of deceleration cannot exceed 1 step per group so the motor movement not in all instances exactly correspond with the instantaneous difference. However, it will decelerate to zero before reversing its direction (if the B register count is caused to go negative by the net difference) to process the remaining number of input pulses.

If the motor has been found to be able to accelerate at one step per time interval of 0.00625 seconds (160 pulses/sec.) and if the pulse rate generator has a count of 64, then the oscillator rate could be 64 × 160 or 10,240 $H_z$. Thus the extent of the time interval is set by the rate of the oscillator 37 and the spillover count of the generator 36. For an operating situation where the motor can change its velocity faster, the system only requires that the oscillator 37 rate be increased thereby decreasing the time interval and increasing the velocity change while if an operating situation requires a slower velocity change then the oscillator rate is decreased to increase the time interval. The value of NC is not altered by the change in the time interval. Thus by merely changing the oscillator 37 rate, which if a voltage controlled oscillator requires only a turn of an adjustable potentiometer knob, the present system may be tailored to a specific operating situation within a wide range of operating situations.

If it is desired to stop the motor during a movement even though there are pluses to be translated into steps, the oscillator rate is decreased to essentially make the time interval infinite. To start motor movement, the oscillator rate merely needs to be increased. Such a change does not introduce error by not translating each input pulse into a step provided the rate of change of the oscillator is within the motor's velocity change ability. Thus, the rate of oscillator 37 controls velocity change (i.e., acceleration or deceleration) independently of the maximum velocity set by the rate of the oscillator 16 within the bounds of the system.

It will accordingly be understood that there has been disclosed a circuit for accepting input pulses with each input pulse directing a digital motor means to produce a step or increment of movement. The circuit controls the rate at which the motor is required to change its velocity to within its ability by supplying step commanding pulses in groups, with there being a whole number of pulses in each group and with the difference in the number of pulses between a present group and its immediately prior group being not greater than a set number with one set number being 1. The circuit determines the number of pulses in each group using digital components which include two registers, one register containing the number of pulses in a present group and the other the difference between the number of steps remaining at the end of a present group and the number of steps required for deceleration at the beginning of a present group. The circuit by the use of two registers is thus rendered quite simple, economical and reliable.

Variations and modifications may be made within the scope of the claims and portions of the improvements may be used without others.

We claim:

1. A circuit for accepting commands for a movement defined by a number of input pulses each representing an incremental step comprising digital motor means for receiving motor pulses and producing an incremental step for each motor pulse received with there being one motor pulse produced for each input pulse, means for subdividing the motor pulses into a plurality of consecutive groups, means for providing motor pulses at a plurality of different rates and means for selecting one of the rates for each of the groups, said selecting means including a first register means for maintaining a count of the number of pulses in a present group and a second register means for maintaining a count that varies in accordance with the difference between the number of input pulses remaining for which a motor pulse is to be produced and the number of motor pulses required to decelerate the motor to the end of the movement.

2. The invention as defined in claim 1 in which the pulse rates and the time interval for each group of pulses are selected to provide a whole number of motor pulses in each group.

3. The invention as defined in claim 2 in which the selecting means selects a rate for a present group that produces no more than a one pulse difference in the number of pulses for the present group as compared to the number of pulses in the immediately prior group.

4. The invention as defined in claim 1 in which the second register means has a count that numerically equals the difference in the number of input pulses remaining for which a motor pulse is to be produced with motor pulses being considered to be produced for the present group and the number of motor steps required for deceleration without including the motor pulses of the present group.

5. The invention as defined in claim 4 in which the selecting means includes means for comparing the counts of both registers and for selecting a rate that produces more motor pulses in the present group than in the immediately prior group if the count of the second register is greater than the count of the first register.

6. The invention as defined in claim 5 in which the selecting means decreases towards zero the count of the second register means by a value that is twice the number of pulses in the present group for each group selected that has a higher number of pulses than its immediately prior group.

7. The invention as defined in claim 4 in which the selecting means includes means for comparing the counts of both register means and for selecting the same rate for the present group as the immediately prior group when the count of the second register means is less than the count of the first register means.

8. The invention as defined in claim 7 in which the selecting means decreases towards zero the count of the second register means by a value that is equal to the number of pulses in the present group for each group that is selected to have the same rate as the prior group.

9. The invention as defined in claim 4 in which the selecting means includes means for comparing the count of the second register means with a zero count and selecting a rate that has less motor pulses in the present group than in the immediately prior group if the count of the second register means is less than zero.

10. The invention as defined in claim 1 in which the command includes directing the movement in one direction or the other, in which the motor means is reversible and accepts motor pulses having an indication of the direction of movement and in which the first register means counts in either direction from zero with a count in one direction producing motor pulses indicating movement in one direction and a count in the other direction producing motor pulses indicating movement in the other direction.

11. The invention as defined in claim 1 in which the circuit accepts a command for a further movement defined by a further number of pulses while the motor means is producing the steps of a prior command and in which the circuit includes means for algebraically adding the further number of pulses to the count of the second register means.

12. The invention as defined in claim 11 in which each command includes directing the movement to be in one direction of another direction, in which the second register means counts in either direction from zero and in which further input pulses are added to increase the count of the second register means for further movement in the same direction as the motor means is presently moving and are subtracted to decrease the count in the other direction from zero for further input pulses indicating movement in the other direction when the motor means is moving in the one direction.

13. The invention as defined in claim 1 in which the means for providing motor pulses at a plurality of different rates includes adjustable means for proportionately changing all of the different rates.

14. The invention as defined in claim 13 in which the selecting means includes means for setting the time duration for each group and in which the last named means is interconnected with the adjustable means to have the time interval change proportionately with the proportional change in the different rates.

* * * * *